United States Patent [19]

Sassenberg

[11] Patent Number: 4,582,306

[45] Date of Patent: Apr. 15, 1986

[54] VISE JAW

[76] Inventor: Richard Sassenberg, 180 E. Prospect Ave., Mamaroneck, N.Y. 10543

[21] Appl. No.: 607,740

[22] Filed: May 7, 1984

[51] Int. Cl.[4] .............................................. B23Q 3/02

[52] U.S. Cl. .................................... 269/134; 269/138; 269/244; 269/282

[58] Field of Search ................ 269/134, 138, 244, 282

[56] References Cited

U.S. PATENT DOCUMENTS

| | | | |
|---|---|---|---|
| 1,405,306 | 1/1922 | Martin | 269/138 |
| 3,514,092 | 5/1970 | Lassy | 269/134 |
| 4,345,750 | 8/1982 | Glaser | 269/138 |

*Primary Examiner*—Frederick R. Schmidt

*Assistant Examiner*—Judy J. Hartman

*Attorney, Agent, or Firm*—Eugene E. Geoffrey, Jr

[57] ABSTRACT

A vise jaw for attachment to a vise jaw support which includes a first plate for attachment to the vise jaw support in place of the standard vise jaw and having a plurality of vertically elongated openings formed therein and a second plate overlying the first plate and having a plurality of pins extending therefrom and engaging the openings in the first plate, a spring carried by the first plate and engaging at least one pin to urge the second plate to a normal uppermost position and a structure carried by the first plate and operable to engage one of the pins in an opening therein to urge the second plate downwardly when a work piece has been fastened in the vise.

9 Claims, 10 Drawing Figures

VISE JAW

This invention relates to vise jaws and more specifically to a novel and improved jaw for use on vises for milling machines, drill presses and other similar equipment to precisely position the work piece relative to the vise bed.

Vises for use with power machinery such as milling machines, for instance, usually have a bottom plate or bed having a fixed jaw support at one end of the bed, a slidable jaw support carried by the bed for movement to and from the fixed jaw and screw threaded means for moving the slidable jaw support to facilitate clamping of a work piece between the two jaws. The jaw supports were also generally provided with removable jaws to facilitate replacement when they become worn. While such vises are generally classified as precision devices, the track assembly holding the movable jaw support must have some clearance, however small, so that the jaw support can be moved readily and will not bind with temperature changes or for other reasons. Furthermore, with use, the track assembly is subjected to wear with the result vertical movement of the movable jaw on a new vise may be as little as 0.001 inches, while a used vise may have vertical play of as much as 0.015 inches. In the case of a work piece to be held between the jaws of a vise, the work piece is usually placed on two supports to space it from the vise bed. In so doing, when the vise is tightened, the movable jaw will tilt upwardly and casue the movable jaw together with the edge of the work piece in contact with the movable jaw to move upwardly so that the work piece will no longer be positioned precisely relative to the base or bed of the vise. As a result, milling or boring operations intended, for example, to be normal to the surface of the work piece which should be parallel to the vise bed will be at some angle other than normal depending upon the play in the movable jaw.

Heretofore, the difficulty with vises as discussed above has been overcome by driving each work piece downwardly after the jaws have been tightened, being careful not to damage the work piece in any way. This procedure, of course, is both mandatory and time consuming when performing precision operations on a multiplicity of work pieces.

This invention overcomes the difficulties heretofore encountered even with precision vises and provides novel and improved means for quickly and easily displacing the edge of the work piece, in contact with the movable jaw, downwardly after the vise has been tightened so that the surface of the work piece will be moved into precise parallelism with the vise bed or some other predetermined angular relationship to the vise bed depending upon the machining operation to be performed.

Another object of the invention resides in the provision of a novel and improved vise jaw which may readily be secured to a vise jaw support in place of the standard removable jaw so that the work piece can be correctly positioned quickly and easily after the vise has been tightened. While the improved vise jaw is generally used on the movable jaw support, a second improved jaw may also be used on the fixed jaw support.

Still another object of the invention resides in a provision of a novel and improved vise jaw for accurately positioning a work piece in a vise.

The vise jaw for attachment to a vise jaw support in accordance with the invention includes a first plate for attachment to a vise jaw support in place of the standard vise jaw and having a plurality of vertically elongated openings formed therein and a second plate overlying the first plate and having a plurality of pins extending therefrom and engaging the openings in the first plate. A spring carried by the first plate and engaging at least one pin urges the second plate to a normal uppermost position and a structure carried by the first plate and operable to engage one of the pins in an opening therein functions to urge the second plate downwardly after a work piece has been fastened in the vise.

The above and other objects and advantages of the invention will become more apparent from the following description and accompanying drawings forming part of this application.

IN THE DRAWINGS

Figure 1:
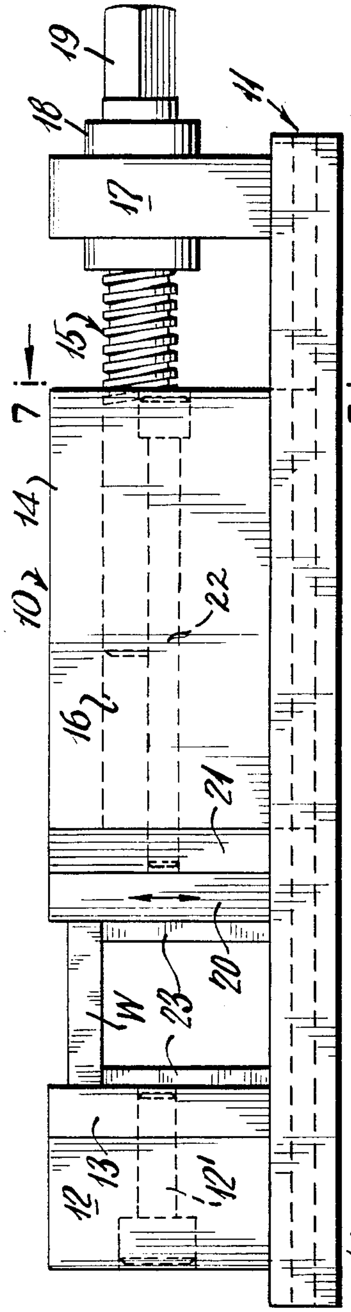
FIG. 1 is a side elevational view of one embodiment of a vise of the type generally used on milling machines and other similar equipment and embodying a vise jaw in accordance with the invention.

Referring now to the drawings and more specifically to FIG. 1 showing a vise of the type generally utilized for holding a work piece on a milling machine or other similar equipment and embodying an improved vise jaw on the movable jaw support which is in accordance with the invention. More specifically, the vise generally denoted by the numeral 10 includes a base plate 11, a fixed jaw support 12 at one end of the base 11 having a vise jaw 13 secured to the inner face thereof by bolts or cap screws 12′ and a movable jaw support 14. The movable jaw support is slidably carried by the base 11 and is moved toward and away from the fixed jaw by a lead screw 15 threadably engaging an opening 16 in the jaw support 14 and rotatably carried by a fixed support 17 and retained therein by a bearing 18 to prevent longitudinal displacement of the lead screw 15. The outer or right hand end of the lead screw projecting from the bearing 18 is formed with a square or hexagonal end portion 19 to receive a wrench or other suitable means for rotation of the lead screw for the purpose of operating the vise. The movable vise jaw support 14 carries an improved vise jaw comprising overlying plates 20 and 21. As will be shown, the plate 21 is secured to the face of the vise jaw support by a pair of bolts 22 and the vise jaw 20 overlies the front of the plate 21 and is movable vertically relative to the plate 21.

Figure 7:
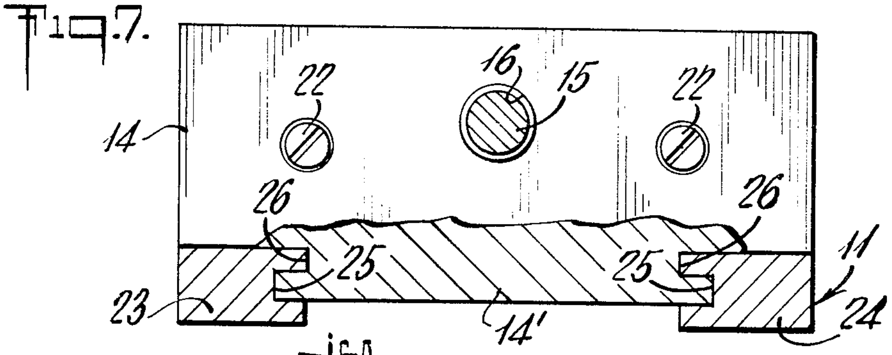
FIG. 7 is an end elevational view of the movable vise jaw of the vise shown in FIG. 1 and taken along the lines 7—7 thereof.

FIG. 7 illustrates one arrangement for slidably supporting the movable jaw support 14 on the base 11. In this form, the base 11 includes side rails 23 and 24 each having a longitudinal groove 25 on the inner side wall. The movable jaw support 14 has a downwardly extending portion 14′ of reduced width with a pair of longitudinal grooves 26. With this configuration, the jaw support will slidably engage and be retained by the base 11. As will become apparent, the fixed vise jaw support 12 may also be provided with the vise jaw in accordance with the invention by simply removing the jaw 13 and replacing it with the new jaw as in the case of the movable jaw support 14.

FIGS. 2A through 6B illustrate the structure of the improved vise jaw in accordance with the invention which includes the overlying plates 20 and 21. It will be observed in the course of the following description that the plate 20, as illustrated in FIG. 1, is normally held in a raised position and can be readily moved downwardly after the work piece W is secured between the vise jaws. Normally, the work piece W is held in a raised position between cooperating vise jaws by a pair of supports 23. When the movable jaw is moved toward the work piece to secure it between the jaws, the movable jaw support 14 will tend to raise and slightly lift the adjoining end of the work piece W so that it is no longer parallel with the vise base 11. With this invention, the vise jaw portion 20 can be readily moved downwardly to secure the work piece tightly against the supports 23 and thus insure proper alignment of the work piece W with the surface of the base 11 of the vise.

Figure 2A:
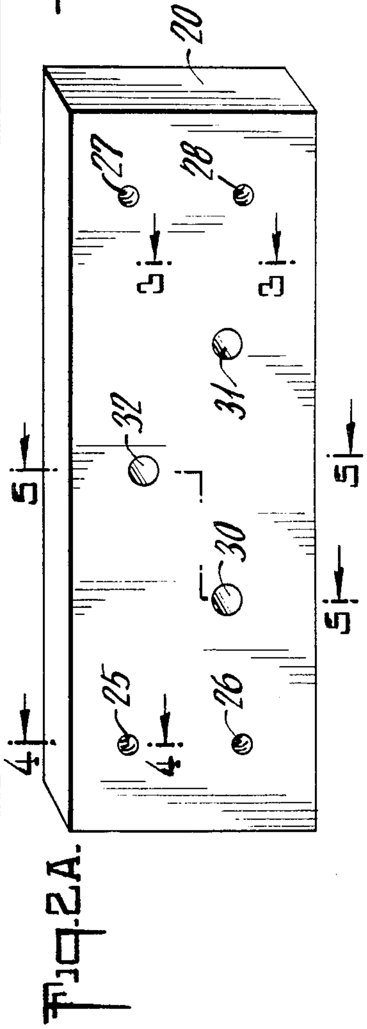
FIG. 2A is a front elevational view of an oblique projection of the outer plate of the improved vise jaw shown in FIG. 1.

The vise jaw portion 20 is in the form of a flat plate as illustrated in FIG. 2A and includes four openings 25 through 28 extending therethrough, each of which is threaded to receive a button-head Allen cap screw 29 for the purpose of holding the plate 20 in slidable engagement with the front face of the plate 21. The openings 30, 31 and 32 include pins 33 and 34 fixedly secured in the openings in any desirable manner. One desirable procedure which has been found to be satisfactory involves the formation of fine splines 33′ and 34′ on one end of the pins 30, 31 and 32 and then forcing the pins into the cooperating holes so that portions of the pins extend from the rear face of the plate 20.

Figure 3:
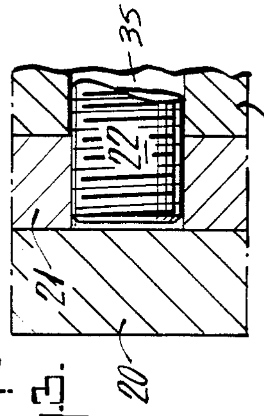
FIG. 3 is a cross sectional view of FIGS. 2A and 2B taken along the lines 3—3 and 3—3 thereof.
Figure 2B:
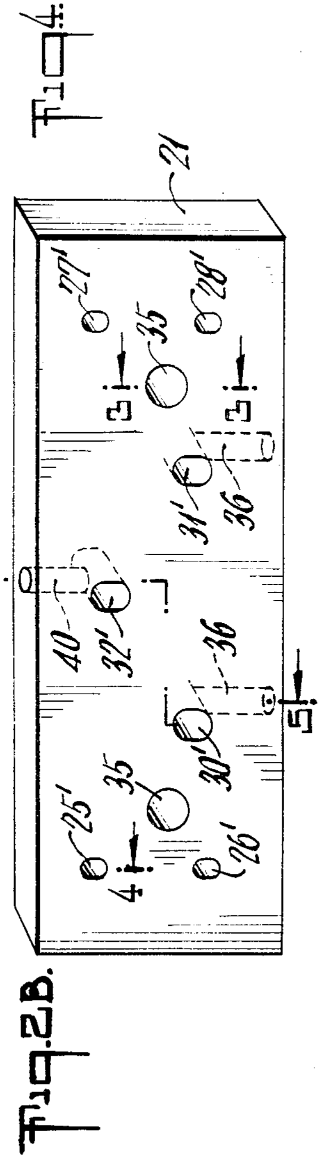
FIG. 2B is a front elevational view of an oblique protection of the rear plate of the improved vise jaw shown in FIG. 1.
Figure 4:
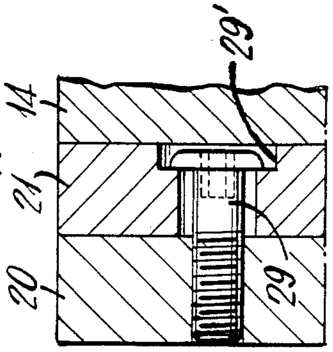
FIG. 4 is a cross sectional view of the vise jaw shown in FIG. 1 and taken along the lines 4—4 and 4—4 of FIGS. 2A and 2B.

FIG. 2B illustrates the rear plate 21 which includes openings 25′ through 28′, 30′, 31′ and 32′ which are precisely aligned with the corresponding openings in the plate 20 as illustrated in FIG. 2A. Each of these openings is vertically elongated so that when the plate 20 is placed in overlying relationship with the plate 21, the pins 33 and 34 will engage the corresponding elongated openings and permit the plate 20 to be moved vertically with reference to the plate 21. The openings 25′ through 28′ in plate 21 are recessed as indicated at 29′ in FIG. 4 to accommodate the heads of the button-head Allen cap screws 29 so that the heads will be slightly below the rear surface of the plate. The cap screws 29 function to secure the plates 20 and 21 in aligned overlying relationship and at the same time permit vertical displacement of plate 20. While cap screws have been used to hold plates 20 and 21 together, it is obvious that dove-tail tenons and cooperating mortises may be employed in place of the cap screws to achieve the same objectives. The plate 21 further includes a pair of threaded openings 35 to receive the bolts or cap screws 22 as shown in FIGS. 1 and 3 in order to secure the plate 21 firmly against the forward face of the movable jaw support 14.

Figure 5:
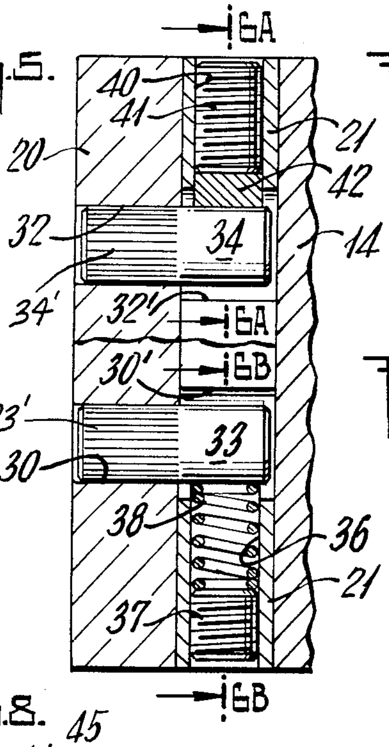
FIG. 5 is a cross sectional view of FIGS. 2A and 2B taken along the lines 5—5 and 5—5 thereof.
Figure 6A:
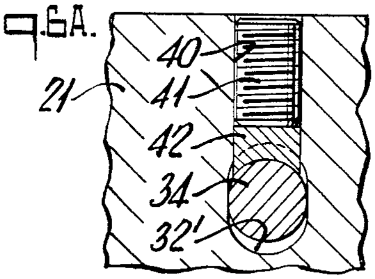
FIG. 6A is a cross sectional view of FIG. 5 taken along the lines 6A—6A thereof.
Figure 6B:
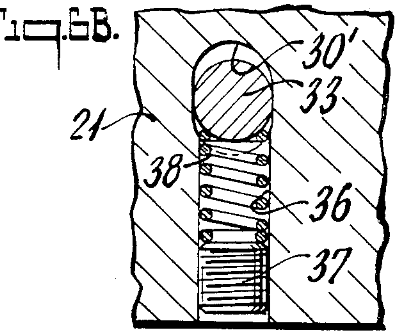
FIG. 6B is a cross sectional view of FIG. 5 taken along the lines 6B—6B thereof.

As previously mentioned, the vise jaw plate 20 is normally held in a raised position relative to the plate 21 and for this purpose openings 36 are formed in the bottom surface of the plate 21 and intersect the openings 30′ and 31′. The lower end of each opening 36 is threaded to receive a threaded member 37, such as an Allen-head screw, for the purpose of retaining a spring 38 within the opening 36. As shown in FIG. 5, the springs 38 bear against the pins 33 in the openings 30′ and 31′ and function to urge the plate 20 upwardly.

In order to urge the plate 20 downwardly, the plate 21 includes a threaded opening 40 formed in the top surface of the plate 21 and intersecting the opening 32′. A threaded element, such as an Allen-head set screw 41, is threaded into the opening 40 and bears against a block 42 which in turn engages the pin 34 as shown in FIG. 5. When the threaded element or set screw 41 is rotated to move it upwardly, the springs 38 bearing against the pins 33 will displace the plate 20 upwardly.

When utilizing the improved vise jaw in accordance with the invention, the threaded element or set screw 41 is rotated to move it outwardly and permit the plate 20 to assume its uppermost position. Normally, the movement of the plate 20 need not be more than 0.015 inches to 0.020 inches since any vise wherein the movable vise jaw has play exceeding that amount has generally exceeded its useful life. The work piece W is then placed on a pair of supports 23 as previously described and when the vise is tightened by operation of the lead screw 15, the forward end of the movable jaw support 14 will normally lift as it engages the work piece W so that the work piece will no longer be seated solidly on the support 23 adjoining the movable vise jaw. The work piece however must be seated solidly on the two supports before the performance of machining operations and this invention avoids the problem of having to forceably set the work piece on the two supports and at the same time prevent damage to the work piece. Therefore, when the vise is tightened, the threaded set screw 41 is then manually rotated clockwise to move it downwardly against the pin 34. In so doing, the plate 20 will move the adjoining edge of the work piece downwardly to solidly seat it against the supports without the danger of damaging the work piece in any way. It is evident that with this improved vise jaw, the time required on the part of a machinist is greatly reduced and this is particularly advantageous in the production processes. From the foregoing, it is also evident that the fixed vise jaw 13 may be removed from its support 12 and replaced by a similar improved vise jaw in accordance with the invention.

Figure 8:
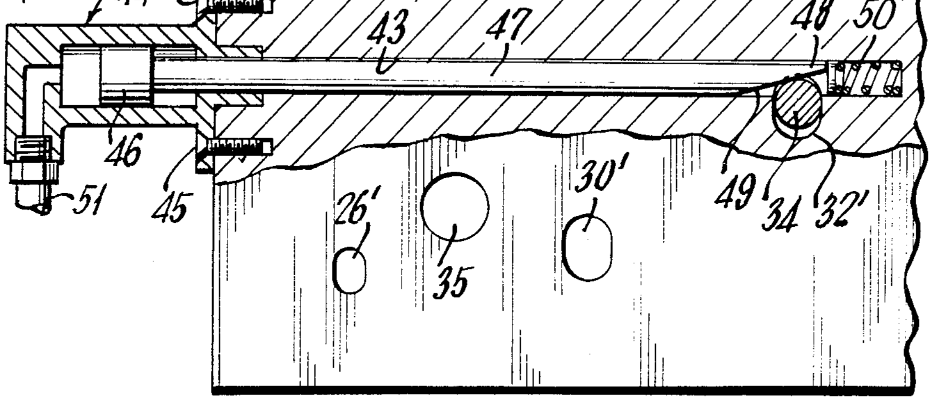
FIG. 8 is a fragmentary front elevational view in partial section of a modified form of the rear plate of the improved vise jaw illustrated in FIGS. 1 and 2B.

A modified form of the invention is illustrated in FIG. 8 and functions to further simplify the operation of the improved vise jaw. In this form of the invention, the plates 20 and 21 are substantially identical with the exception that the plate 21′ as shown in FIG. 8, does not include the opening 40 intersecting the opening 32′ but in its place is provided with a substantially horizontal opening 43 extending from one edge of the plate 21′ and intersecting the side of the opening 32′. A fluid actuated cylinder generally denoted by the numeral 44 is secured to the side of the plate 21 by a pair of screws 45 and the piston 46 has a shaft 47 extending therefrom and through the opening 43. The inner end 48 of the shaft 47 is formed with an inclined surface or ramp 49 which bears against the top of the pin 34. A spring 50 may be disposed within the inner end of the opening 43 to bear against the shaft 47 and constantly urge it outwardly or in the direction away from the pin 34. A suitable fluid, such as air or oil, may be introduced into the cylinder 44 through the inlet conduit 51 to urge the piston to the right as illustrated in FIG. 8. In so doing, the pin 34 will be urged downwardly and therefore carry the plate 20 downwardly in the same manner as that obtained with the set screw 41 as shown in previous figures. By the provision of a suitable valve controlling the admission and discharge of the fluid from the cylinder 44, the machine operator can very quickly and easily operate the improved vise jaw to seat the work piece W firmly against the cooperating supports 23.

While only certain embodiments of the invention have been illustrated and described, it is apparent that alterations, changes and modifications may be made without departing from the true scope and spirit thereof.

What is claimed is:

1. A vise jaw for retro-fitting an existing vise having a base and a pair of jaw supports carried by said base, at least one jaw support being movable for clamping a work piece therebetween by attachment of said vise jaw to at least said movable jaw support of said vise in place of the conventional jaw, said vise jaw comprising a first plate having means for firm attachment to at least said movable jaw support, a second plate overlying said first plate, aligning means carried by said plates for maintaining them in alignment one with the other and for displacing said second plate vertically with reference to the first plate, means for maintaining said second plate in a normally raised position and means carried by at least one of said plates for urging said second plate downwardly with a work piece clamped in said vise to move the edge of the work piece in contact with said second plate downwardly.

2. A vise jaw according to claim 1 wherein said aligning means comprises at least two pins carried by one of said plates and extending toward the other plate and said other plate includes at least two elongated openings for slidably receiving said pins whereby said plates will remain in alignment one with the other with said second plate being movable vertically relative to said first plate.

3. A vise jaw according to claim 2 wherein said other plate includes spring means acting on at least one of said pins to normally maintain said second plate in a raised position relative to said first plate.

4. A vise jaw according to claim 3 wherein said means for urging said·second plate downwardly comprises threaded means carried by said other plate and engaging one of said plurality of pins and operable upon rotation thereof to move said second plate downwardly relative to the first plate.

5. A vise jaw according to claim 3 wherein said means for urging said second plate downwardly includes camming means for displacing said second plate downwardly relative to the first plate.

6. A vise jaw for retro-fitting an existing vise having a base and a pair of jaw supports carried by said base, at least one jaw support being movable for clamping a work piece therebetween by attachment of said vise jaw to at least said movable jaw support of said vise in place of the conventional jaw, said vise jaw comprising a first plate having means for attachment to at least said movable jaw support and a plurality of spaced, elongated openings, a second plate overlying said first plate, said second plate including a plurality of pins extending therefrom and engaging said elongated openings in said first plate to maintain alignment of said second plate with said first plate and permit vertical movement of said second plate relative to said first plate, elevating means carried by said first plate and engaging at least one of said plurality of pins to resiliently hold said second plate in a normally raised position and means carried by said first plate also engaging at least one of said plurality of pins to urge said second plate downwardly with a work piece clamped in said vise.

7. A vise jaw according to claim 6 wherein said elevating means comprises at least one vertical opening in said first plate and extending upwardly from the bottom edge thereof and intersecting one of said elongated openings and a coil spring within said vertical opening and engaging one of said plurality of pins in the last said opening to hold said second plate in a normally raised position.

8. A vise jaw according to claim 6 wherein the last said means comprises a threaded opening extending downwardly from the upper face of said first plate and intersecting one of said elongated openings and a threaded member in said threaded opening whereby rotation of said threaded member to move it downwardly in said threaded opening will bear against one of said plurality of pins in said elongated opening and move said second plate downwardly.

9. A vise jaw according to claim 6 wherein the last said means includes an elongated opening extending from an edge of said first plate and intersecting the upper portion of a side edge of one of said elongated openings, a shaft having an inclined camming surface on one end thereof slidably engaging the upper side of one of said plurality of pins engaging said opening and means for longitudinally displacing said shaft whereby said shaft upon movement in one direction urges said pin and said second plate downwardly and upon movement in the other direction permits movement of said second plate upwardly.

* * * * *